US00RE42855E

(19) United States
(12) Reissued Patent
Kim

(10) Patent Number: US RE42,855 E
(45) Date of Reissued Patent: Oct. 18, 2011

(54) METHOD FOR FORMING ELECTRODE FOR PLASMA DISPLAY PANEL

(75) Inventor: Sang-Tae Kim, Seoul (KR)

(73) Assignee: LG Electronics Inc., Seoul (KR)

(21) Appl. No.: 10/644,757

(22) Filed: Aug. 21, 2003

Related U.S. Patent Documents

Reissue of:
(64) Patent No.: 6,276,980
Issued: Aug. 21, 2001
Appl. No.: 09/365,879
PCT Filed: Aug. 3, 1999

(30) Foreign Application Priority Data

Aug. 5, 1998 (KR) ..... P98-31912

(51) Int. Cl.
*H01J 9/02* (2006.01)

(52) U.S. Cl. ..... 445/24; 427/125

(58) Field of Classification Search ..... 445/23–25; 313/498–512; 427/125
See application file for complete search history.

(56) References Cited

U.S. PATENT DOCUMENTS

| | | | | |
|---|---|---|---|---|
| 3,774,038 A | | 11/1973 | Ligtenberg | |
| 4,243,455 A | | 1/1981 | Shiba et al. | |
| 4,507,151 A | | 3/1985 | Simm et al. | |
| 5,122,215 A | | 6/1992 | Shibata et al. | |
| 5,662,846 A | | 9/1997 | Swarts | |
| 5,998,920 A | | 12/1999 | Kim | |
| 6,086,790 A | * | 7/2000 | Hayashi et al. | 252/500 |
| 6,120,975 A | | 9/2000 | Tokai et al. | |

FOREIGN PATENT DOCUMENTS

JP 62-040356 2/1987

OTHER PUBLICATIONS

Office Action issued for U.S. Appl. No. 11/511,537 dated Feb. 3, 2010.
Office Action issued for U.S. Appl. No. 11/511,535 dated Feb. 17, 2010.
Office Action issued for U.S. Appl. No. 11/511,536 dated Feb. 17, 2010.

* cited by examiner

*Primary Examiner* — Joseph L Williams
(74) *Attorney, Agent, or Firm* — Ked & Associates LLP

(57) ABSTRACT

The present invention relates to a discharge sustaining electrode formed of a transparent electrode and a non-transparent electrode for a plasma display panel (PDP), and it is an object of the present invention to provide a method for an electrode which is well applicable to forming a non-transparent electrode using an Ag material and providing a good productivity and a certain contrast characteristic. The method for forming a bus electrode according to the present invention includes a first step for coating Ag paste including some black powder having different specific gravity particles and some Ag white powder on the transparent electrode, a second step for level-separating the black and white powders contained in the coated Ag paste based on a specific gravity difference for a certain time, and a third step for burning out a binder from the coated Ag paste to thereby implementing a firing process. Therefore, it is possible to implement a two-tier bus electrode structure based on one time paste printing operation to thereby decrease a formation process of an electrode.

13 Claims, 3 Drawing Sheets

AMENDED
FIG. 5
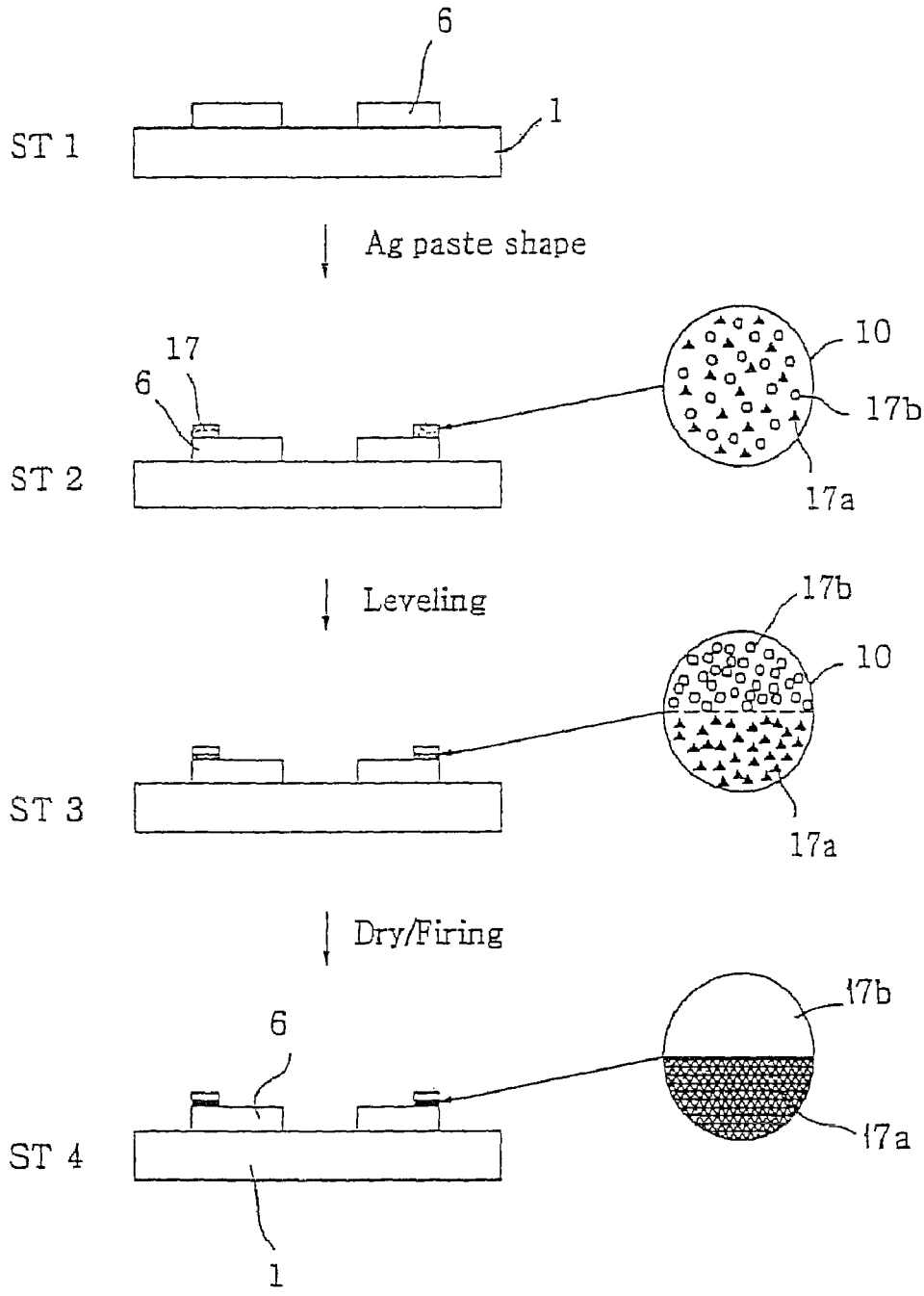

METHOD FOR FORMING ELECTRODE FOR PLASMA DISPLAY PANEL

Matter enclosed in heavy brackets [ ] appears in the original patent but forms no part of this reissue specification; matter printed in italics indicates the additions made by reissue.

*This application is a Reissue Application of U.S. Pat. No. 6,276,980. More than one reissue application has been filed for the reissue of U.S. Pat. No. 6,276,980. The reissue application Ser. Nos. are 10/644,757 (the present and parent Reissue application), filed Aug. 21, 2003, 11/511,535, filed Aug. 29, 2006 (abandoned), 11/511,536, filed Aug. 29, 2006 (abandoned), 11/511,537, filed Aug. 29, 2006 (abandoned), and 11/511,538, filed Aug. 29, 2006 (abandoned).*

BACKGROUND OF THE INVENTION

1. Field of the Invention

The present invention relates to a PDP(Plasma Display Panel), and in particular to a method for forming a discharge sustaining electrode which is capable of sustaining an image formed based on a surface discharge in a certain discharge space when a discharge voltage is supplied in a multiple pair in a display apparatus which uses plasma.

2. Description of the Background Art

Generally, a PDP(Plasma Display Panel) is a plane display apparatus which is capable of displaying a motion picture or a still picture using a gas charge phenomenon and is classified into a 2-electrode type, a 3-electrode type and a 4-electrode type. The 2-electrode type is directed to applying a voltage for an addressing and sustaining operation using 2 electrodes, and the 3-electrode type is directed to a surface discharge type and is switched or sustained based on a voltage applied to an electrode installed at a lateral surface of a discharge cell.

In particular, an electrode formed on an image display side panel is formed of a transparent electrode made of a glass material for implementing a certain transmittivity of visual ray. A non-transparent having a small width for overcoming the problems of the present invention in which the conductivity of a transparent electrode is decreased is used integrally with respect to the transparent electrode.

As the width of a metallic electrode is decreased, the transmittivity is increased, so that the width is an important factor for determining a luminance of a PDP.

FIGS. 1 through 4 illustrate a conventional 3-electrode surface discharge PDP.

FIG. 1 is a perspective view illustrating separated upper and lower substrates, FIG. 2 is a view illustrating an installation of electrodes, and FIG. 3 is a view illustrating a state that an upper substrate is rotated at an angle of 90 for explaining the principle of a discharge.

As shown therein, the conventional 3-electrode surface discharge PDP includes a front substrate 1 which is a display surface of an image, and a rear substrate which is parallel to the front substrate 1.

The front substrate 1 is formed of discharge sustaining electrodes C and S which are formed in a pair form at one pixel for sustaining a light emitting operation of a corresponding cell, a dielectric layer 8 for controlling a discharge current of the discharge sustaining electrodes C and S and insulating the electrodes, and a protection layer 9 formed on the dielectric layer 8 for protecting the dielectric layer 8.

The rear substrate 2 is formed of a partition 3 for forming a plurality of discharge spaces, namely, separating cells, a plurality of address electrodes A for forming a discharge pixel at each portion which is crossed by the discharge sustaining electrodes C and S on the front substrate 1, and a fluorescent layer 5 formed on the both sides of the partition 3 and the rear substrate 2 in the interior of each discharge pixel for thereby emitting a visual ray for implementing an image display during an address display.

In addition, the discharge sustaining electrodes C and S are formed of a scan electrode C and a common electrode C. As shown in FIG. 3, each electrode is formed of an ITO electrode 6 which is formed of a transparent conductive material for enhancing a transmittivity and a bus electrode 7 formed of a metallic material. There is a certain interval between the electrodes C and S. When a discharge voltage is applied to both ends of the ITO electrode 6, a surface discharge is generated in a corresponding discharge space. The bus electrode 7 is formed of a metallic material on the ITO electrode 6 and acts to prevent a voltage drop due to the resistance of a transparent conductive material when current is applied.

The light emitting operation of a certain pixel of the conventional PDP will be now explained.

First, when a discharge start voltage of 150~300V is applied to the scan electrode S at a corresponding cell, an address discharge is generated between the scan electrode S and the address electrode A for thereby forming a wall electric charge on an inner surface in a corresponding discharge space.

Thereafter, when an address discharge voltage is supplied to the scan electrode S and a corresponding address electrode A, an address discharge is generated between the scan electrode S and the address electrode A.

Namely, an electric field is formed in the interior of a corresponding cell, the electrons of the discharge gases are accelerated, and the accelerated electrons collide with ions. At this time, the ionized electrons collide with neutron particles, so that the neutron particles are ionized into electrons and ions at high speed, whereby the discharge gas becomes a plasma state, and a vacuum infrared ray is formed.

The thusly generated infrared ray excites the fluorescent layer 5 to thereby generate a visual ray, and the thusly generated infrared ray is outputted to the outside via the front substrate 1, so that it is possible to recognize a light emitting operation of a certain cell for thereby implementing an image display.

Thereafter, when a discharge sustaining voltage higher than 150V is supplied to the common electrode of the light emitting cell, a sustaining discharge is generated between the scan electrode S and the common electrode C for thereby sustaining a light emitting operation of the cells.

In the conventional PDP, the discharge sustaining electrodes C and S each formed of the ITO electrode 6 and the bus electrode 7 will be explained in detail.

The ITO electrode 6 is formed of a transparent material having a certain conductivity for implementing a transmittivity of visual ray, so that an electric conductivity is low.

Therefore, when fabricating a large size PDP using the above-described ITO electrode 6, it is impossible to display a certain image due to a voltage drop between the first end and the last end to which the voltage is applied. In order to overcome the above-described problems, the metallic bus electrode 7 having a good conductivity is used. Since the bus electrode 7 had a non-transparent characteristic, it is possible to block light displayed in the discharge space and decrease the entire luminance. Therefore, it is needed to maintain a minimum width.

The conventional bus electrode is formed in a three tier structure of Cr-Cu-Cr. Since this structure is implemented by etching each layer, an etching process is complicated, and an under cutting problem may occur when etching the lower layers, so that the quality of the product is decreased. In order to correct the above-described problems, a single film structure is used.

Preferably, the single film is formed of Al and Ag. An aluminum material is cheap, and the electric conductivity of aluminum is lower than Ag. In the case of using Ag, the fabrication cost is increased.

FIG. 4 illustrates a process for forming the bus electrode 7 using Ag.

Namely, in Step SI1, in a state that the ITO electrode is formed on the front substrate 1, and in Step ST2, a black paste 7a including a black non-pattern pigment is printed at an end portion of the ITO electrode 6, and a drying and firing process is performed. In Step ST3, a white paste 7b including a white Ag powder is printed, and a drying and firing process is performed, so that an Ag material bus electrode 7 is formed. At this time, the thickness of the electrode is 5 μm.

In the case that the thickness of the electrode is too thick, the roughness of the surface of the dielectric layer is decreased for thereby causing a malfunction during the discharge.

The black paste 7a is used for enhancing a contrast of the PDP, and the white paste is used for enhancing the luminance.

However, in the thusly constituted electrode structure, since the conductivity at the black portion is small, when applying a voltage for a discharge, a crack problem may easily occur, so that the reliability of the PDP may be decreased due to an open electrode due to the crack.

In addition, since the bus electrode is formed using black and white pastes, the number of the processes and a tack time are increased, and the fabrication cost is increased. In the conventional art, since more than two time printing processes are required, it is impossible to implement a thickness below 5 μm.

SUMMARY OF THE INVENTION

Accordingly, it is an object of the present invention to provide a method for forming an electrode capable of increasing a productivity of the products and implementing a thin film printing operation by forming a bus electrode which acts to drop voltage of a transparent electrode using a single paste film using Ag.

To achieve the above objects, there is provided a method for forming an electrode for a PDP which includes the steps of a first step for coating Ag paste including some black powder having different specific gravity particles and some Ag white powder on the transparent electrode, a second step for level-separating the black and white powders contained in the coated Ag paste based on a specific gravity difference for a certain time, and a third step for burning out a binder from the coated Ag paste to thereby implementing a firing process, in the method for forming a discharge sustaining electrode in which a transparent electrode and an Ag non-transparent electrode are integrally formed at an image display side substrate among two substrates which form a plasma display panel.

In the leveling step, the black powder is stacked on a lower portion, and said white powder is positioned at an upper portion.

The specific gravity of the black powder is greater than the specific gravity of the white powder.

The specific gravity of the black powder is higher than 7, and the specific gravity of the white powder is higher than 3.

The black powder is formed of a black pigment and glass frit.

The black pigment is formed of a metallic oxide selected from the group comprising Cr, Co and Mn.

When forming Ag paste formed of two types powders as a single layer, as the time is elapsed, the black powder having a higher specific gravity is formed at a lower portion, and a white Ag powder is formed on the upper portion, so that it is possible to form a two layer non-transparent electrode which having a better contrast characteristic, namely, a bus electrode.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is view illustrating a bus electrode formation process according to the present invention.

DETAILED DESCRIPTION OF THE PREFERRED EMBODIMENTS

Figure 1:
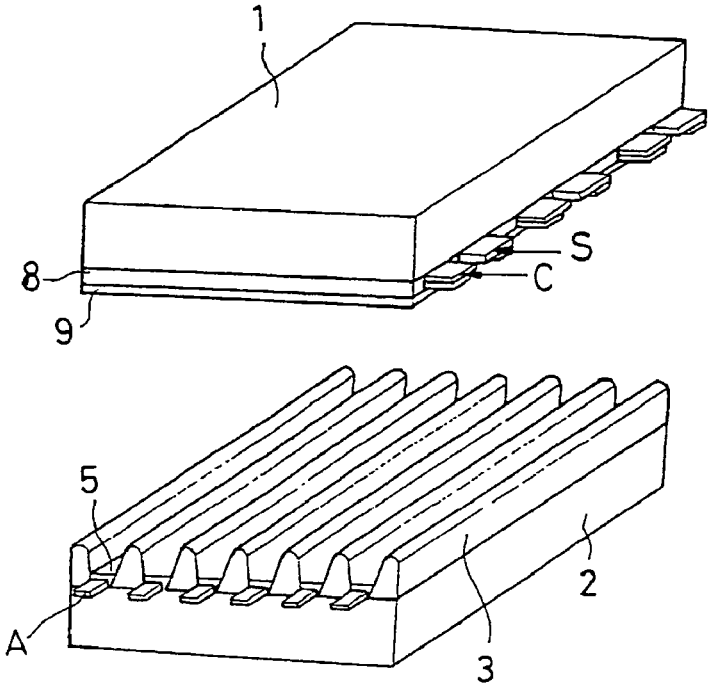
FIG. 1 is a perspective view illustrating separated upper and lower substrates for a conventional 3-electrode surface discharge PDP.
Figure 2:
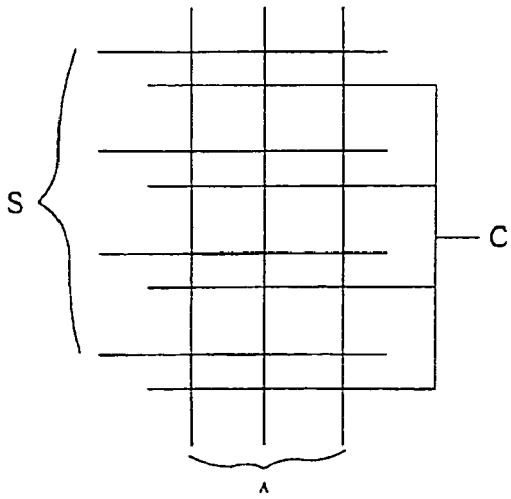
FIG. 2 is a view illustrating an electrode installation for a conventional PDP.
Figure 3:
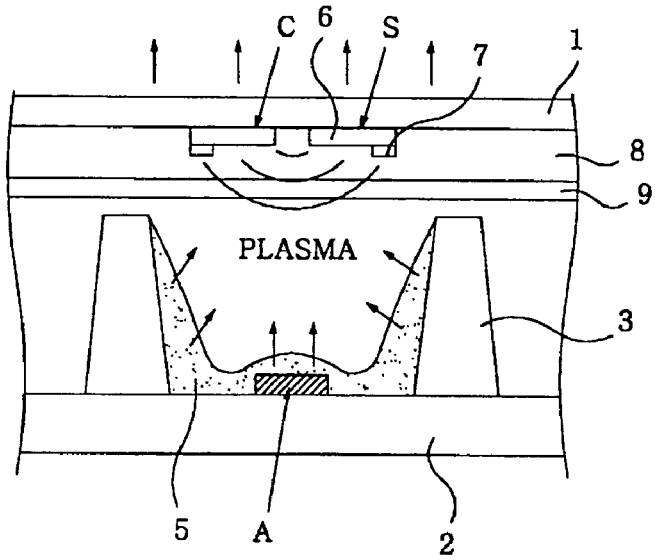
FIG. 3 is a view illustrating a state that an upper substrate is rotated at an angle of 90 for explaining the principle of a discharge.

The method for forming an Ag material non-transparent electrode, namely, bus electrode according to the present invention will be explained with reference to the accompanying drawing.

First, the same constructions as the conventional art in a discharge process between the electrodes will be omitted. The same elements as the conventional art will be given the same reference numerals.

FIG. 5 illustrates a bus electrode formation process according to the present invention.

In the present invention, in order to form a bus electrode, some black powder 17a having a specific gravity higher than 7 and formed of some black pigment (for example, Cr) and some glass frit, and a white Ag powder 17b having a specific gravity lower than 3 are mixed with a binder 10 for thereby forming an electrode formation Ag paste 17.

In Step ST1 of FIG. 5, Ag paste 17 is printed at both ends of an transparent electrode 6 of a front substrate 1 in the same pattern as in Step ST2. At this time, a white Ag powder 17b and some black powder 17a are distributed by the same amount in the printed paste 17.

In Step ST3, the black powder 17a is stacked on the lowest portion based on its specific gravity during a leveling time (about 30 minutes from a printing to a dry). On the contrary, the white Ag powder 17b is positioned at the upper portion based on its weight.

Thereafter, the drying and firing processes are performed, and the binder 10 contained in the Ag paste together with powders is burned out into the air, and the remaining powders are melted and plastically hardened, so that a bus electrode formed of two layers having different colors and powder layers are formed as shown in Step ST4.

In the electrode formation method according to the present invention, it is possible to form a bus electrode formed of two layers of an Ag material and black pigment based on one time printing process, so that a certain luminance and contrast is implemented during a driving discharge.

In addition, the black powder 17a formed of a black pigment and glass frit and the white powder 17b formed of Ag con-exist between particles which are not fully separated at a boundary portion, so that a coupling force between layers is enhanced, and it is possible to prevent any escape at the boundary portion.

Figure 4:
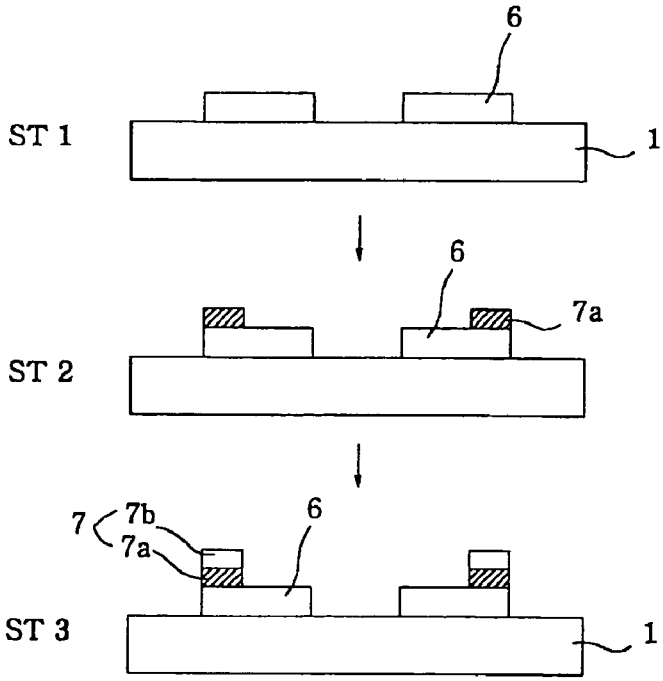
FIG. 4 is a cross-sectional view illustrating an electrode portion formed of Ag in the conventional art.

In addition, when forming an Ag material bus electrode, comparing the conventional electrode formation process as shown in FIG. 4 with the structure of a discharge sustaining electrode according to the present invention, in the conventional art, a paste is formed and printed two times for forming a black layer and white layer. Therefore, in the conventional art, the productivity is decreased, and a crack occurs at an interlayer boundary. However, in the present invention, since a black layer and white layer of a bus electrode are implemented by one time printing process, so that the productivity is enhanced, and it is possible to form an electrode of a thin film below 5 μm.

As described above, in the present invention, since one time printing process is performed using Ag paste mixed with black and white Ag powders having different specific gravity, it is possible to form a bus electrode having a better luminance and contrast, whereby the productivity is increased.

In addition, a thin film printing operation of an electrode is implemented, so that a malfunction which may occur during the discharge due to a rough surface of a dielectric layer is decreased, and it is possible to enhance the characteristic of a PDF discharge.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

[1. In a method for forming a discharge sustaining electrode in which a transparent electrode and an Ag non-transparent electrode are integrally formed at an image display side substrate among two substrates which form a plasma display panel, a method for forming a non-transparent electrode, comprising;

a first step for coating Ag paste including some black powder and some white powder having different viscosity particles on the transparent electrode;

a second step for level-separating the black and white powders contained in the coated Ag paste based on a specific gravity difference for a certain time; and a third step for burning out a binder from the coated Ag paste to thereby implementing a firing process.]

[2. The method of claim 1, wherein in said leveling step, said black powder is stacked on a lower portion, and said white powder is positioned at an upper portion.]

[3. The method of claim 1, wherein the specific gravity of the black powder is greater than the specific gravity of the white powder.]

[4. The method of claim 1, wherein the specific gravity of the black powder is higher than 7, and the specific gravity of the white powder is lower than 3.]

[5. The method of claim 1, wherein said black powder is formed of a black pigment and glass frit.]

[6. The method of claim 5, wherein said black pigment is formed of a metallic oxide selected from the group comprising Cr, Co and Mn.]

*7. A method of forming a multi-layer structure for a display panel, comprising:*

*forming a layer having a composition of intermixed first and second components, wherein the first component is different in color from the second component; and*

*thereafter forming two substantially separate and distinct sub-layers within the layer, wherein a first sub-layer comprises the first component and the second sub-layer comprises the second component.*

*8. The method of claim 7, wherein the first component is darker than the second component.*

*9. The method of claim 7, wherein each component has a specific gravity, and wherein the two sub-layers are formed within the layer based on the specific gravity of each of the two components.*

*10. The method of claim 7, wherein the second component is Ag.*

*11. The method of claim 7, wherein the first component is a black powder.*

*12. The method of claim 7, wherein the first component has a specific gravity larger than 7, and the second component has a specific gravity smaller than 3.*

*13. The method of claim 7, wherein said forming of two sub-layers within the layer further includes heating said two sub-layers.*

*14. The method of claim 13, wherein said heating of said two sub-layers includes drying or firing.*

*15. The method of claim 7, wherein the display panel is a plasma display panel.*

*16. The method of claim 7, wherein the multi-layer structure is a sustain electrode of a plasma display panel.*

*17. The method of claim 7, wherein each component has a different specific gravity, wherein the difference is sufficient to cause separation of each component into its own sub-layer by gravity.*

*18. The method of claim 15, wherein the multi-layer structure is a sustain electrode of the plasma display panel.*

*19. The method of claim 18, wherein the structure of the plasma display panel comprises:*

*a front substrate;*

*a rear substrate in parallel to the front substrate;*

*sustain electrodes on the front substrate;*

*an insulating layer on the sustain electrodes;*

*partitions formed between the front substrate and the rear substrate;*

*an address electrode on the rear substrate; and*

*a fluorescent layer within the partitions.*

* * * * *

UNITED STATES PATENT AND TRADEMARK OFFICE

CERTIFICATE OF CORRECTION

PATENT NO. : RE42,855 E
APPLICATION NO. : 10/644757
DATED : October 18, 2011
INVENTOR(S) : Kim It is certified that error appears in the above-identified patent and that said Letters Patent is hereby corrected as shown below:

On the Title Page:

Item [64], Replace sub-heading, PCT Filed: with sub-heading, Filed.

Signed and Sealed this
First Day of November, 2011

David J. Kappos

David J. Kappos
*Director of the United States Patent and Trademark Office*